US008055538B2

(12) United States Patent
Fogelson (10) Patent No.: US 8,055,538 B2
(45) Date of Patent: Nov. 8, 2011

(54) METHOD AND SYSTEM FOR CREATING ADVERTISEMENT BOOKS

(76) Inventor: Bruce A. Fogelson, Chicago, IL (US)

( * ) Notice: Subject to any disclaimer, the term of this patent is extended or adjusted under 35 U.S.C. 154(b) by 1865 days.

(21) Appl. No.: 09/885,970

(22) Filed: Jun. 21, 2001

(65) Prior Publication Data

US 2002/0198771 A1  Dec. 26, 2002

(51) Int. Cl.
*G06Q 30/00* (2006.01)
(52) U.S. Cl. .................................. 705/14.4; 705/329
(58) Field of Classification Search .................. 705/14, 705/329
See application file for complete search history.

(56) References Cited

U.S. PATENT DOCUMENTS

| 5,506,393 | A |   | 4/1996 | Ziarno | 235/380 |
|---|---|---|---|---|---|
| 5,546,303 | A | * | 8/1996 | Helbling | 705/30 |
| 5,555,497 | A |   | 9/1996 | Helbling | 364/401 |
| 5,663,547 | A | * | 9/1997 | Ziarno | 235/380 |
| 5,724,518 | A |   | 3/1998 | Helbling | 395/201 |
| 5,793,972 | A |   | 8/1998 | Shane | 395/200.49 |
| 5,887,273 | A |   | 3/1999 | Ziarno | 703/59 |
| 5,895,902 | A |   | 4/1999 | Ziarno | 235/380 |
| 6,052,674 | A |   | 4/2000 | Zervides et al. | 705/40 |
| 6,073,138 | A |   | 6/2000 | de l'Etraz et al. | 707/104 |
| 6,092,052 | A |   | 7/2000 | Ziarno | 705/21 |
| 6,112,191 | A | * | 8/2000 | Burke | 705/41 |
| 6,161,124 | A |   | 12/2000 | Takagawa et al. | 709/203 |
| 6,401,075 | B1 | * | 6/2002 | Mason et al. | 705/14 |
| 6,408,278 | B1 | * | 6/2002 | Carney et al. | 705/14 |
| 6,460,036 | B1 | * | 10/2002 | Herz | 707/748 |
| 2001/0014868 | A1 | * | 8/2001 | Herz et al. | 705/14 |
| 2001/0034647 | A1 | * | 10/2001 | Marks et al. | 705/14 |
| 2002/0026360 | A1 | * | 2/2002 | McGregor et al. | 705/14 |
| 2002/0029179 | A1 | * | 3/2002 | Gruber et al. | 705/35 |
| 2002/0038225 | A1 | * | 3/2002 | Klasky et al. | 705/1 |
| 2002/0040374 | A1 | * | 4/2002 | Kent | 707/516 |
| 2002/0049816 | A1 | * | 4/2002 | Costin et al. | 709/206 |
| 2002/0052756 | A1 | * | 5/2002 | Lomangino | 705/1 |
| 2002/0073026 | A1 | * | 6/2002 | Gruber et al. | 705/39 |
| 2002/0095357 | A1 | * | 7/2002 | Hunter et al. | 705/27 |
| 2002/0103698 | A1 | * | 8/2002 | Cantrell | 705/14 |
| 2002/0162106 | A1 | * | 10/2002 | Pickover et al. | 725/42 |
| 2002/0188532 | A1 | * | 12/2002 | Rothstein | 705/29 |
| 2005/0209914 | A1 | * | 9/2005 | Nguyen et al. | 705/14 |
| 2008/0022010 | A1 | * | 1/2008 | Franklin et al. | 709/231 |

OTHER PUBLICATIONS

Rivera, Carla. "United Way to Give Donors a Choice," Los Angeles Times, Jul. 26, 1990.*
Hodge, Shelby. "De Tocqueville Society trumpets United Way," Houston Chronicle, Feb. 28, 1999.*
Morton, Cynthia Renee. "Corporate social advertising's effect on audience attitudes toward company and cause," The University of Texas at Austin, 1999.*
Campbell, Leland. "Consumer evaluation and response to philanthropic advertising," University of Massachusetts Amherst, 1992.*

* cited by examiner

*Primary Examiner* — Michelle Tarae
(74) *Attorney, Agent, or Firm* — Husch Blackwell LLP (57) ABSTRACT

A method and apparatus are provided for preparing ad-books over a communications network. The method includes preparing an advertisement at a user terminal connected to the communications network. The method further includes processing the advertisement at a server connected to the communications network for placing the advertisement in an ad-book.

58 Claims, 5 Drawing Sheets

FIG. 5 — Please Select Advertisement Background

METHOD AND SYSTEM FOR CREATING ADVERTISEMENT BOOKS

BACKGROUND OF THE INVENTION

1. Field of the Invention

This invention relates generally to advertisement books, and more particularly, to computerized/automated preparation, production, publishing and management of ad-books and related print publishing frequently used by charities for fund raising.

2. Related Art

Advertisement books (used herein as "ad-books") are fundraising vehicles whereby members and supporters of an organization pay the organization to place an advertisement (used herein as "ad") or message in an organization's publication for the dual purpose of advertising and contributing to the group. Organizations that may use ad-books include charities, schools, teams, associations, clubs, professional organizations, lodges, unions, boards, fraternities, sisterhoods, causes, hospitals, homes, condo-boards, synagogues, events, community groups, and political party candidates. Typically, an organization will solicit members and supporters to buy an ad in their ad-book and either sell or give away the ad-books as a fundraising tool. As a fundraising tool, ad-books (and related publications) are similar to group fnd-raisers such as award dinners, car washes, bake-sales, raffles, auctions, golf-outings, or similar events. Each such event offers members and supporters an excuse or opportunity to contribute and help the organization raise money. Further, ad-books are often produced along with or in the form of dinner-programs, group directories, group calendars, raffles, yearbooks, newsletter, or along with other simple content or events.

Although ad-book ads are viewed by advertisers as a deductible business expense, the "advertiser's" primary economic motivation is to make a contribution to the organization as opposed to receiving quality or value for a purchase. In this sense, this type of ad is based on the advertiser's desire to support the organization (or be seen among his/her peers as supporting). Often ad-books are a part of the social fabric of the charitable community and allow donors to be recognized for their contributions. For example, a large and generous donor may be recognized in a prominent full-page, gold-leaf ad, while smaller donors may be acknowledged in smaller ads. Thus, the ad-book may be seen as a roll of givers that acts as a directory, establishes a pecking-order, and may even pressure others to donate. In this sense, ad-books give the advertiser the opportunity to be known as a benefactor.

The process of putting together an ad-book includes gathering advertisers, creating ads, collating ads, collecting money, issuing receipts, performing layout of content and graphics, and printing and distributing ad-books. Organizations that use ad-books as a fundraising vehicle usually perform these tasks by organizing committees of volunteers. Many of these tasks may be performed by the organization or sent to local businesses to assist with the production of the ad-books. In either case, the process is quite time consuming and very labor intensive for the organizations that use ad-books as a fundraising vehicle. Further, since organizations generally do not collaborate or co-fundraise, the economic benefit that arises from producing ad-books in large quantities for many different organizations is unavailable. Thus, a number of alternative fundraising ways are known and preferred to using ad-books.

In the field of pure charity, we know of at least one known reference describes a method of and device for streamlining, simplifying and inducing the giving of contribution or gift commitments by contributors or prospective gift givers that involves dispersing through a crowd of prospective contributors or gift givers a plurality of keyless, electronic contributions or gifts management devices for immediate entry of consecutive data comprising the identities of the contributors or gift givers making the monetary contribution commitments or monetary gift commitments.

Another known "charity" reference describes a method of capturing monetary donations or monetary gifts made by donors or gift givers at points in time and space in which said donors or gift givers are optimally motivated to make said donations or gifts, said donations or gifts being the donation or gift preferences of respective donors or gift givers. The method comprises inputting a multiplicity of sequences of data comprised of monetary donations or monetary gifts. The monetary donations or monetary gifts are made by a plurality of said respective donors or gift givers consecutively free of input of information unrelated to said respective monetary donations or monetary gifts at a multiplicity of distinct sites where said donations and gifts are being received.

Another known "non-ad" reference describes a central office that correlates charitable contributions made at vending stations in food service establishments which issue information carriers in return for charitable contributions which are receipts for the contribution and entitle the donor to a beverage dispensed from a machine responding to the information carrier. Yet another known reference describes a multiplicity of charitable collection stations with selectors for choosing the charity to which a contribution is destined, a change maker for issuing change if desired, a display for displaying information with respect to premiums available and contributions made, and a modem or other telecommunicator for two-way communications with a central station.

However, none of these known ways streamlines the creation, publishing, and development of ads, ad-books or related print-jobs. Accordingly, a new method and system for creating ad-books is needed.

SUMMARY

A method and apparatus are provided for preparing ad-books over a communications network. The method includes preparing an advertisement at a user terminal connected to the communications network. The method further includes processing the advertisement at a server connected to the communications network for placing the advertisement in an ad-book.

Many features and benefits are reasonably expected from this invention, e.g. automated renewal notices, multi-year ad placement, standardized content management, standardized ad-book features such as covers, sizes, table of contents, affinity group content, and celebrity endorsement; consolidated printing and print work bidding, consolidated advertising and account management, cross-ad-book advertising and demographic specific publication, automated up-selling techniques, on-line publishing and directory services, lock-box collection, services and specialized accounting, reporting and receipts, which are typical of not-for-profit and political organizations.

Other embodiments, features, and advantages of the invention will be apparent to one with skill in the art upon examination of the following figures and detailed description. It is intended that all such additional embodiments, features, and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
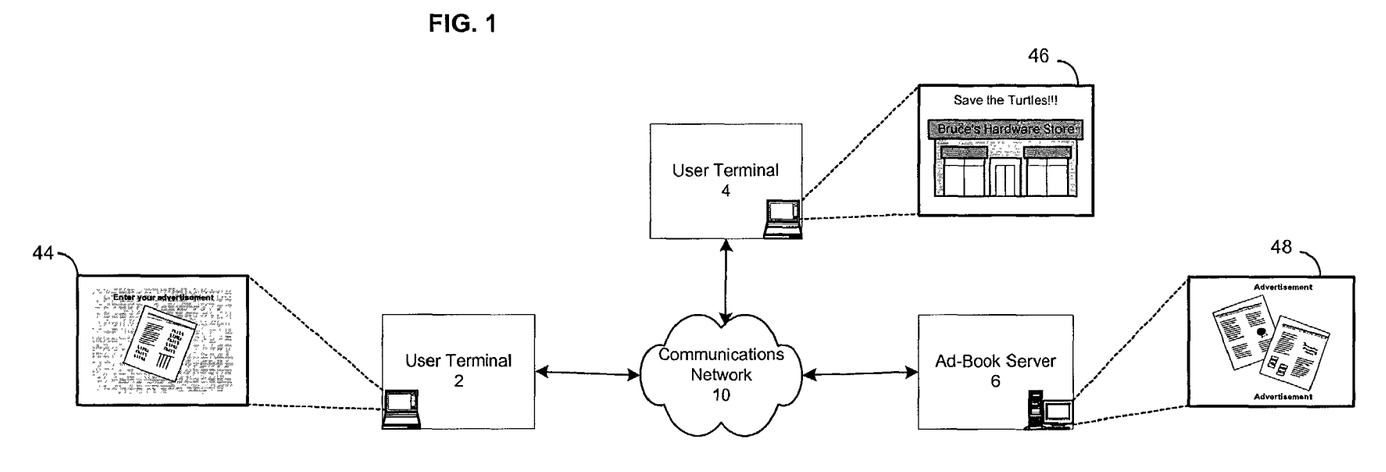
FIG. 1 depicts an ad-book preparation system in accordance with an embodiment of the invention.

FIG. 1 depicts a block diagram of an advertisement book (used herein as "ad-book) preparation system under an embodiment of the invention. Under the embodiment, an advertiser may use a user terminal 2, 4 to prepare an advertisement to be placed in an ad-book. An ad-book server 6 receives advertisement data from a user terminal 2, 4 via a communications network 10. In an illustrative embodiment, communications network 10 functions to carry information between the user terminals 2, 4 and the ad-book server 6 to facilitate the creation of ad-books. The communications network 10 may include circuit switched telephony as used in public switch telephone networks (PSTN) or data packet networks adhering to Internet Protocol (IP), frame relay, or Asynchronous Transfer Mode (ATM) protocols. In an illustrative embodiment, communications network 10 provides IP communication for user terminal 2, 4 and ad-book server 6.

As used herein, an advertiser includes members and supporters of an organization, e.g. charity, school, team, association, club, professional organization, lodge, union, board, fraternity, sisterhood, cause, hospital, home, condo-board, synagogue, event, community group, political party candidate, and volunteers and staff of the organization. For example, a local hardware store may be an advertiser since it may desire to support the local community group. Further, the advertiser may include representatives and agents of the members and supporters. For example, a marketing manager or a secretary for the marketing manager may be termed an "advertiser" for purposes of this application. Further yet, volunteers or members of the organization may serve as advertisers. For example, a local bakery may desire that the volunteers of the synagogue put together the advertisement on the bakery's behalf.

The user terminal 2, 4 functions to provide an interactive input apparatus for the creation of advertisements to be placed in ad-books. As used herein, the term "advertisement" includes announcements, statements, proclamations, public statements, posters, billboards, public notices, classified ads, want ads, commercials, flyers, brochures, and other information to be disseminated to the public. The advertisement may includes graphics, simple text, images, video clips, audio clips, and audiovisual information.

Figure 2:
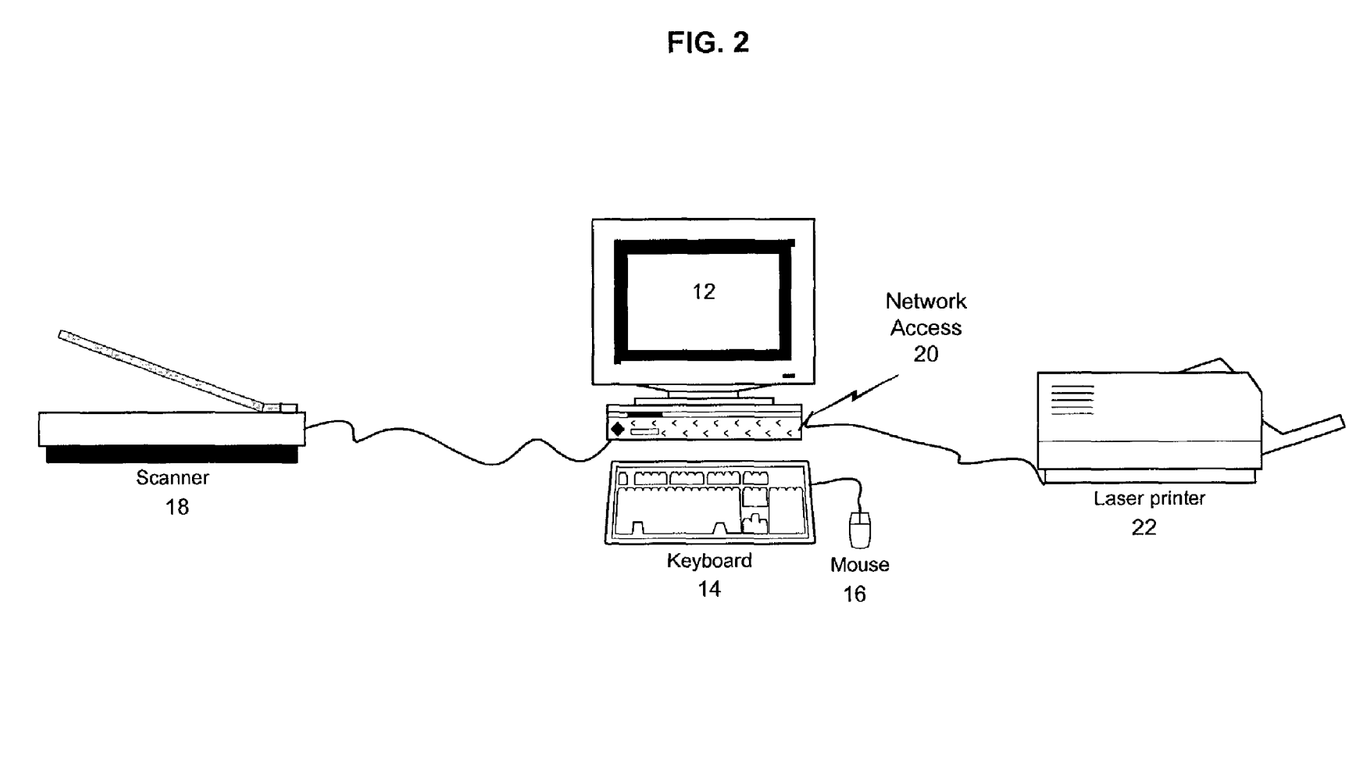
FIG. 2 illustrates an example user terminal of FIG. 1.

An embodiment of the present invention may be employed and used in conjunction with any computer system, such as a personal computer, a notebook computer, a personal digital assistant (PDA), a cellular telephone, or a mobile/wireless assistant or automatic teller machine (ATM) or automatic ticket dispenser. For example, as shown in FIG. 2, a user terminal 2, 4 may be a personal computer system including a monitor 12, a keyboard 14, a mouse 16, random access memory (RAM), storage in the form of a hard disk, a scanner 18, and network access 20 to the communications network 10. The personal computer may also include a floppy disk, a CD-ROM drive, read-only-memory, a modem, speakers, a camera, and a laser printer 22 as are well known in the art. In addition to a personal computer, the user terminal 2, 4 may be practiced using a network computer, a "dumb terminal" on a multi-user system, or an Internet or intranet computer, in which software is resident on the Internet or intranet, rather than stored on a hard disk on a personal computer. Further, the user terminal 2, 4 may either operate in a stand-alone mode or over a network.

The user terminal 2, 4 may be provisioned with computer operating software currently available on a number of platforms, such as Microsoft Windows, Apple MacOS and Sun Solaris. The computer system may be running Windows 98, Windows NT, or equivalent, Palm OS, WindowsCE, or equivalent or an operating system used on Apple or Sun Computers. An embodiment of the present invention is not limited to a particular operating system or computer system to function.

The user terminal 2, 4 allows an advertiser to prepare an advertisement by using the computer (as shown in FIG. 2) to display and edit a desired advertisement. A desired advertisement 44 is shown in FIG. 1 as it would be displayed on the monitor 12 of the user terminal 2. The user terminal 2, 4 may be provisioned with computer software currently available for the preparation of the advertisement or simple content. Computer software, such as Microsoft Office, Corel PageMaker and Adobe PhotoShop may be suitable for the preparation of a desired advertisement. Further, the user terminal 2, 4 may be used to connect with the ad-book server 6 to transmit the desired advertisement to the ad-book server 6 to be printed on a printer or to be formatted for display as an electronic ad-book.

Figure 3:
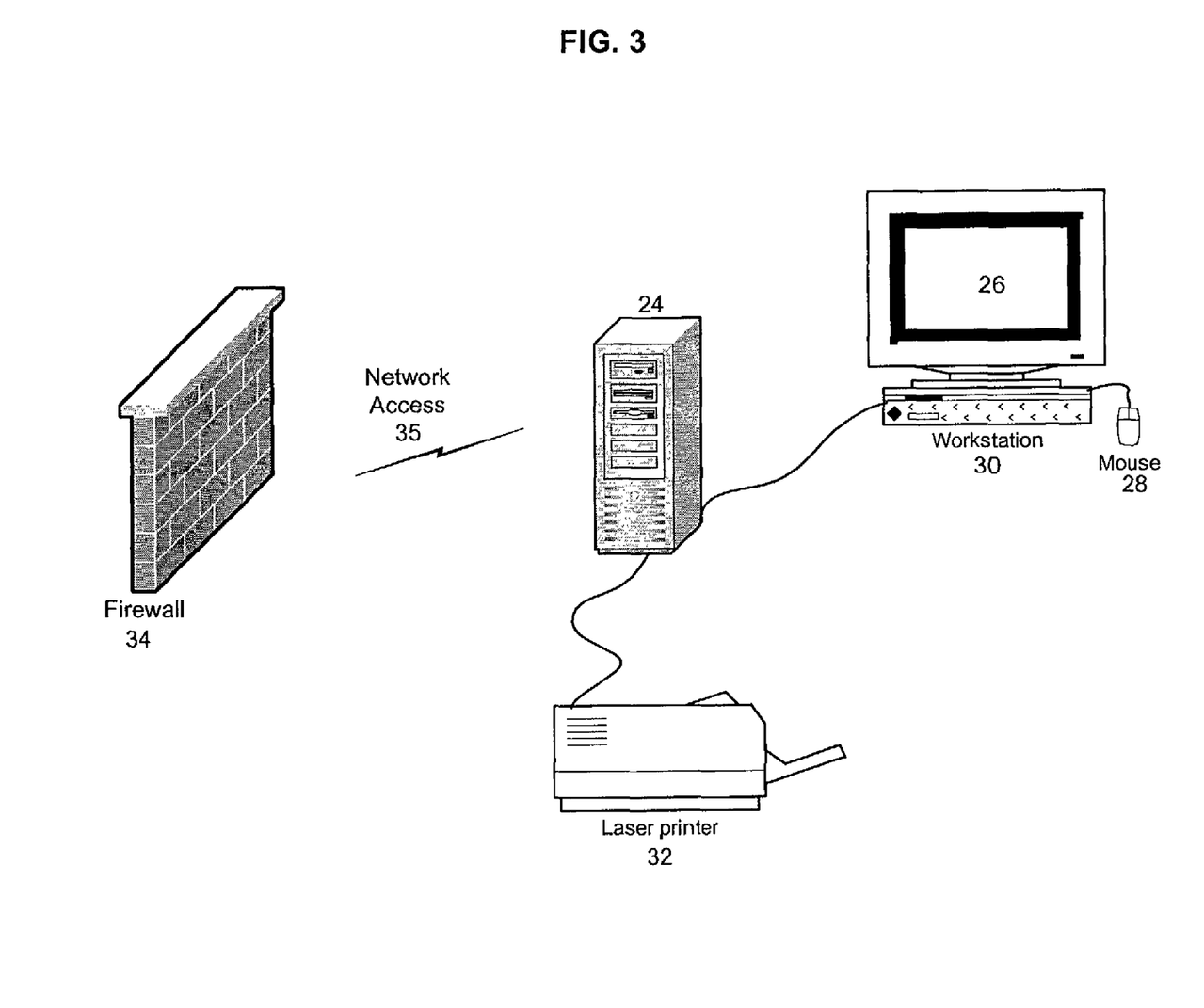
FIG. 3 illustrates an example ad-book server of FIG. 1.

The ad-book server 6 functions to perform processing for the creation of ad-books. It may provide user terminals 2, 4 with the ability to enter prepared content or advertisements or to prepare an advertisement for an ad-book. An embodiment of the ad-book server 6 may be employed and used in conjunction with any computer system, such as a personal desktop computer. For example, as shown in FIG. 3, an ad-book server 6 includes a web server system may include a monitor 26, a keyboard 30, a mouse 28, a processing unit 24, and network access 35 with a firewall 34 to the communications network 10. The web server may also include a floppy disk, a CD-ROM drive, read-only-memory, a modem, speakers, a camera, a zip drive and a laser printer 32 as are well known in the art. Optionally, the ad-book server may include a database for managing ad-books, user terminals 2, 4, advertisers, and advertisements.

The ad-book server 6 may be provisioned with computer operating software currently available on a number of platforms, such as Microsoft Windows, Apple MacOS and Sun Solaris. The computer system may be running Windows 98, Windows NT, or equivalent, Palm OS, WindowsCE, or equivalent or an operating system used on Apple or Sun Computers. In an illustrative embodiment of the present invention, the ad-book server 6 may be programmed as a web server adhering to the Active Server Pages specification to generate web pages for display on the user terminals 2, 4. An embodiment of the present invention is not limited to a particular operating system or computer system to function.

Figure 4:
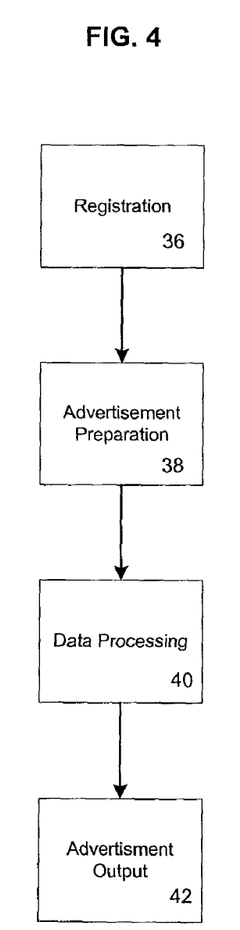
FIG. 4 depicts a flow chart for creating ad-books.

In operation, an embodiment of the present invention functions to allow advertisers at user terminals 2, 4 to produce advertisements for ad-books. FIG. 4 is a flowchart illustrating an example flow of the functions performed by the ad-book server 6 in creating ad-books. Advertisers at user terminals 2, 4 may connect to the ad-book server 6 by accessing the Internet via the communications network 10 and entering a URL address relating to the ad-book server 6. An advertiser at a user terminal 2, 4 may register (see Block 36) with the ad-book server by entering information related to the ad-book, the organization, and the advertiser. For example, the advertiser may enter the business name, address, and telephone number. The advertiser at a user terminal 2, 4 may prepare an advertisement (see Block 38) by a number of different methods including by downloading an advertisement that has been previously prepared, filling in one of several standard forms, and composing an advertisement at the ad-book server 6 (see block 38). Downloading may include transmitting the previously prepared advertisement or standard form from the user terminal 2, 4 to the ad-book server 6 through the communications network 10. An advertiser may directly create an advertisement using applications software such as Microsoft Word, Corel PageMaker and Adobe PhotoShop. As mentioned, an example advertisement 44 prepared on the user terminal 2 and viewed on the monitor 12 of the user terminal 2 is shown in FIG. 1.

Alternatively, an advertisement may be composed at the ad-book server 6 by selecting choices relating to the advertisement including desired size, cost/fee, message, layout, and background from a web-based advertisement preparation tool. The web-based advertisement preparation tool may be executed at ad-book server 6 and may present choices relating to advertisement size, placement, cost/fee, layout, background and text to the user terminals 2, 4. For example, desired messages available for selection may include "Congratulations!" "Good Luck on the Fundraising," and "We Support You!" Further, messages may be personal or personalized so that the advertiser may input personal information such as a name. For example, personalized messages available for selection include "From Your Friends at______", or "With Love From ______".

Figure 5:
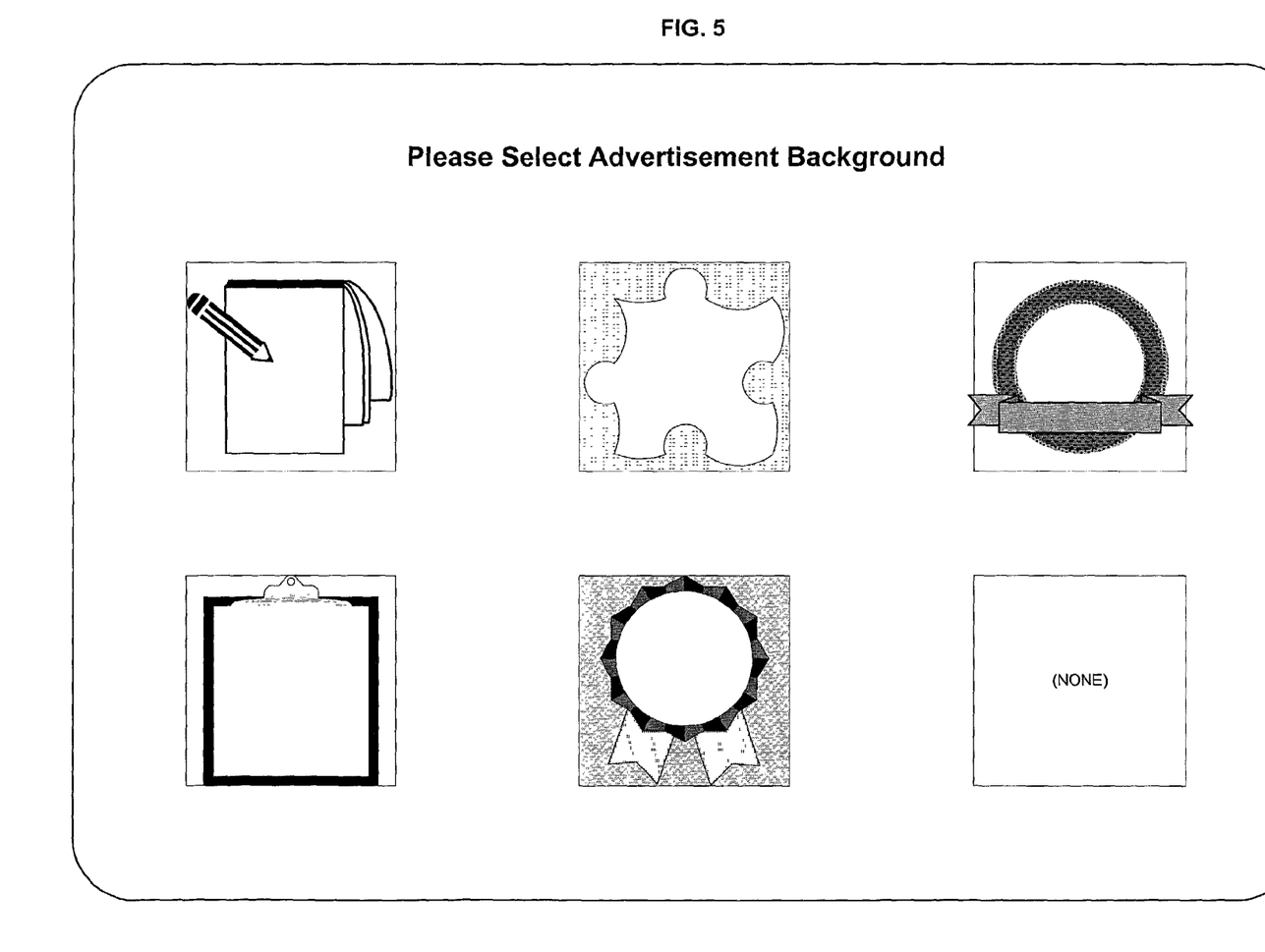
FIG. 5 depicts an example advertisement selection screen.

Advertisement preparation (see Block 38) also includes selecting one of a number of desired backgrounds by using an input apparatus, such as mouse 16 on the user terminal 2, 4, to select among multiple background patterns being displayed. Choices may include regular and premium placement. For example, an advertiser may choose the "Gold" background as shown in FIG. 5 at a higher cost to show their higher degree of support for the organization. Advertisement preparation (see Block 38) may also include selecting font, font size, and color as is known in the art. For example, an advertiser may choose to have white letters in an Ariel font size of 14. Other variations of advertisement preparation are known in the publishing art and will not be further described herein.

Further, it may be possible to select an advertisement theme so that the number of choices that an advertiser has to make in order to compose an advertisement is reduced. For example, a predefined advertisement theme such as "Formal," "Sponsor," "Endower," or "President's Level" may define a message, layout, background and lettering. Further, the cost associated with predefined advertisement themes may commensurate with various levels of giving. Further, an advertiser may input multimedia comprising graphics, images, video clips, audio clips and audiovisual to the advertisement. For example, a photograph input by use of a camera (not illustrated in FIG. 2) may be used as part of the advertisement. If an advertiser wishes to use a previously designed advertisement, or revise a past ad, then the advertiser may select a prepared advertisement from a list of prepared advertisements or from an archive of past ads which may be stored at the ad-book server 6. The ad-book server 6 may maintain archives classified according to a criterion, e.g. advertiser name. Once the advertisement has been prepared, it may be displayed to the advertiser so that further changes or editing may be made. Shown in FIG. 1 is an example advertisement 46 prepared by selecting choices from the ad-book server 6 and shown on the monitor of the user terminal 4.

The ad-book server 6 may also generate messages to the user terminal 4. Messages that may be generated include suggesting modifications to an ad, reminding an advertiser to renew, informing the advertiser of potential ad-books to advertise in, and promoting an advertiser to re-run an ad. The ad-book server 6 may use up-selling sales techniques and user demographic information to suggest specialty ad placement. For example, the server 6 may maintain a database of user demographic information and ad-book characteristics that may be analyzed to form recommendations regarding potential advertiser interest. For example, the server 6 may suggest that an advertiser place an ad on a particular date in an ad-book calendar or the server 6 may suggest that an advertiser place an ad alongside specific members.

Data processing occurs once advertisement preparation has been completed (see block 40). Since many advertisements and many ad-books may be processed at the ad-book server 6, data processing includes classifying each advertisement received into individual ad-books (or multiple ad-books if so desired). For example, Bob's Garage may prepare and transfer an advertisement showing its support for the local girls' softball team to the ad-book server 6. The ad-book server 6 may classify the advertisement for inclusion in the softball team ad-book. Yet another example, a Chicago-area fast food restaurant may support several causes and wish to be included in many different ad-books. Ad-book server 6 may classify the fast food restaurant advertisement for a homeless society ad-book, a legal clinic ad-book and a church affiliated ad-book.

An embodiment of this invention allows one advertiser to support many organizations. For example, a regional or national advertiser wishing to support all organizations that meet the advertiser's demographic, advertising or sponsorship criteria may designate support by selecting all relevant ad-books. In a more specific example, a major cosmetic company may wish to support women's organizations, including girl's sports teams, women's health clubs, and women's charities within its major markets. In yet another example, a major sporting goods supplier may wish to sponsor all youth sport teams. Being able to support many organizations is a benefit of an embodiment of this invention. Pooling organizations together provides efficiency in securing advertisements from an advertiser. Further, pooling allows one advertiser to efficiently support many organizations. Thus, both advertisers and organizations benefit from using an embodiment of this invention.

In an alternate embodiment, data processing (see Block 40) includes the step of processing a mode of payment for placing the advertisement in an ad-book. For example, an advertiser may enter an advertiser's credit card number and request that the bill be charged to the credit card. The mode of payment may also include direct bank drafts or a request to be billed. Ad-book server 6 may process the payment information and send a follow up receipt for payment. Further, the ad-book server 6 may consolidate payment and advertisement information for the advertiser. In such a manner, an embodiment of this invention provides assistance with specialized tax issues which many not-for-profit organizations face.

Data processing (see Block 40) may also include sending an acknowledgement to the advertiser at user terminal 2, 4 that prepared the advertisement. The acknowledgement may include transmitting an electronic mail (email) to the advertiser thanking the advertiser for its support. The email may also include specialized accounting information so as to aid with the specialized tax issues mentioned above. The acknowledgement may also include sending a postal mail to or telephoning the advertiser. Further, data processing (see Block 40) may include sending the advertiser a copy of the advertisement that may be printed in the ad-book or forwarding a copy of an ad-book with the advertisement to the advertiser. In an alternative embodiment, data processing (see Block 40) also includes translating the advertisement into Hypertext Markup Language (HTML) format so that the advertisement may be viewed from user terminals 2, 4 connected to the Internet. Where advertisements may be viewed from user terminals 2, 4, the term publishing is used to describe the ability of users at user terminals 2, 4 to view an ad-book. Where advertisement may be viewed from user terminals 2, 4 as an on-line ad-book on the world wide web, ad-books may or may not be printed in physical form (thus cutting down on printing costs for the organization). Further yet, data processing (see Block 40) may also include managing advertisements and ad-books so that advertisers may include links to preferred web-sites. For example, a hardware advertiser may include a hypertext link to its home page on the Internet. Further, data processing (see Block 40) may also include the step of deleting old advertisements, advertisements not paid for, and old ad-books in the ad-book server 6.

In an alternative embodiment, password protection for the advertisements and ad-books may be available to provide security and limit access to the advertisements and the ad-books. Further, a firewall 34 may be included for the ad-book server 6 so as to provide security and limit access to the advertisements and the ad-books.

Returning to FIG. 4, advertisement output (see block 42) functions to create ad-books that are distributed by an organization to raise money. This may include printing out a typeset copy of an ad-book on the laser printer 32 of the ad-book server 6 or it may include sending an electronic copy of the ad-book to a print shop so that a large number of copies may be printed on a printing press. In an alternative embodiment, advertisement output (see Block 42) also includes displaying advertisements and ad-books to the user terminals 2, 4. Further, electronic versions of the advertisements and ad-books may be viewed by users connecting to the ad-book server 6 through communications network 10. In one embodiment, user terminals 2, 4 may view an electronic ad-book that has HTML versions of the advertisements.

An embodiment of the present invention may be provided as software, which may be loaded from floppy disks, from a CD-ROM, over a network, or from any other suitable storage media. The software may be loaded onto the hard disk drive of a computer in a manner that is known to those skilled in the art.

While various embodiments of the invention have been described, it will be apparent to those of ordinary skill in the art that many more embodiments and implementations are possible that are within the scope of this invention.

What is claimed is:

1. A method for computerized/automated preparation, production, publishing and management of charity or not-for-profit organization ad-books and related print or publishing used by or for recognized not-for-profit organizations, for charity or fund raising, whereby members or supporters of the organization publish or place or manage a message or messages in the organization's publication, such method comprising:

a plurality of members, supporters or contributors at respective user terminals of a computer system connected to a communications network accessing a preparation tool or computer program within a computer processing unit of a charity or not-for-profit organization server or communication network;

the plurality of members, supporters or contributors through the user terminal selecting a respective level of sponsorship of a plurality of sponsorship levels where a cost associated with each level of the plurality of sponsorship levels is commensurate with various levels of monetary giving from the member, supporter or contributor to the governmentally recognized not-for-profit organizations;

the members, supporters or contributors preparing respective messages in support of the organization using the preparation tool or computer program;

the computer processing unit receiving a respective monetary pledge or contribution from the plurality of members, supporters or contributors on behalf of the recognized not-for-profit organization based upon the selected sponsorship level; and the computer processing unit processing the respective messages at the server connected to the communications network in preparation for placing the message in an charity or not-for-profit organization ad-book; and the computer processing unit consolidating the respective messages from the plurality of members, supporters or contributors into the charity or not-for-profit organization ad-book where the consolidated messages define the charity or not-for-profit organization ad-book, where the charity or not-for-profit organization ad-book or related print publication is a fundraising vehicle and the governmentally recognized not-for-profit organizations, members or supporters of the organization solicit for or place the messages to make contributions to the organization and wherein at least some of the messages in the charity ad-book or related print publication contain laudatory statements about the governmentally recognized not-for-profit organization, its activities or its members or its mission or cause.

2. The method of claim 1 wherein preparing further comprises selecting choices relating to the message.

3. The method of claim 2 wherein choices comprises size, placement, color, price, background, font, image or layout.

4. The method of claim 2 wherein choices comprises indicating whether the message shall be printed in a physical charity or not-for-profit organization ad-book or related publication or shall be posted on an on-line charity or not-for-profit organization ad-book posted on an Internet web site as opposed to a physically printed publication or wherein the choice comprises whether the message shall be both printed in a physical charity or not-for-profit organization ad-book or related print publication and also posted on-line on an Internet web site.

5. The method of claim 1 wherein preparing further comprises selecting a type or theme of message to reduce the number of choices that a user must make to produce a message.

6. The method of claim 1 wherein the communications network comprises a public switch telephone network and packet data network.

7. The method of claim 1 wherein the user terminal comprises a computer system.

8. The method of claim 7 wherein the computer system comprises one of a personal computer, a notebook computer, a personal digital assistant (PDA), a cellular telephone or a mobile/wireless assistant.

9. The method of claim 1 wherein the server comprises a web server computer system for accessing the communications network.

10. The method of claim 9 wherein the web server comprises a firewall for maintaining security.

11. The method of claim 10 wherein the firewall limits access to information on the server wherein information comprises the message and the charity or not-for-profit organization ad-books.

12. The method of claim 1 wherein preparing further comprises using computer software running at the user terminal to create a message.

13. The method of claim 12 wherein the computer software comprises at least one of Microsoft Office, Corel PageMaker and Adobe PhotoShop.

14. The method of claim 1 wherein processing further comprises receiving payment information by the server for processing the message for placement in a charity or not-for-profit organization ad-book.

15. The method of claim 1 wherein processing further comprises:
receiving the messages at the server from the user terminal; storing the messages at the server;
and converting the received message into a message to be placed into an charity or not-for-profit organization ad-book or related print or publication.

16. The method of claim 15 further comprising receiving payment information by the server for processing the message for placement in an charity or not-for-profit organization ad-book or related print or publication.

17. The method of claim 15 further comprising classifying the received message into a charity or not-for-profit organization ad-book or related print or publication category said classification based upon amount contributed to the recognized not-for-profit organization or by color of a page to be printed selected from the group consisting of gold, silver and white or by a size of the message selected from the group consisting of full-page, one-half page, one-quarter page, business card size and simple listing of name or contact information.

18. The method of claim 15 further comprising using techniques, the techniques comprising statistics and demographics, to discern at least one group of related messages said discernment based upon amount contributed to the recognized not-for-profit organization or by color of a page to be printed selected from the group consisting of gold, silver and white or by a size of the message selected from the group consisting of full-page, one-half page, one-quarter page, business card size and simple listing of name or contact information.

19. The method of claim 15 further comprising using statistics and demographics, to discern at least one group of related organizations, members or supporters which place messages in charity or not-for-profit organization ad-books or related print or publications.

20. The method of claim 15 further comprising using statistics and demographics, to discern at least one group of related charity or not-for-profit organization ad-books.

21. The method of claim 15 further comprising converting the received message into an HTML format to be shown on at least one user terminal.

22. The method of claim 21 wherein the HTML message is a part of an electronic presentation of charitable support.

23. The method of claim 21 further comprising sending a copy of the HTML message to a member or supporter whom initiated the message preparation.

24. The method of claim 1 further comprising registering with the server whereby a member or supporter at the user terminal connects to the server and enters information relating to the member or supporter.

25. The method of claim 1 further comprising entering a mode of payment at the user terminal to pay for the message to be placed in the charitable or not-for-profit organization ad-book or related print or publication.

26. The method of claim 1 further comprising sending an acknowledgement to an member and/or supporter who places a message in an a charity or not-for-profit organization ad-book or related print or publication notifying the member or supporter of the receipt of the message.

27. The method of claim 1 further comprising sending an acknowledgement to an member or supporter who places a message in a charity or not-for-profit organization ad-book or related print or publication notifying the member or supporter of payment information.

28. A method for computerized/automated preparation, production, publishing and management of charitable or not-for-profit organization ad-books and related print or publishing used by or for recognized not-for-profit organizations for charity or fund raising, whereby organizations, members or supporters of the organization place or manage messages for the benefit of the organization, the method comprising:
a plurality of members, supporters or contributors at a respective user terminal of a computer system connected to a communications network accessing a preparation tool or computer software system within computer processing unit of a server or communication network;
the members, supporters or contributors through the user terminal selecting a respective level of sponsorship of a plurality of sponsorships where a cost associated with each level of the plurality of sponsorship levels is commensurate with various levels of giving of money from the member, supporter or contributor to the governmentally recognized not-for-profit organizations;
the members, supporters or contributors preparing a respective message by selecting choices provided by the preparation tool or computer software system related to the message;
the computer processing unit receiving the respective prepared messages at the server connected to the communications network;
the computer processing unit classifying the prepared message into at least one charitable or not-for-profit organization ad-book;
the computer processing unit receiving a monetary contribution from the contributor on behalf of the governmentally recognized not-for-profit organization based upon the selected level of sponsorship; and
the computer processing unit consolidating the respective prepared messages into a charitable or not-for-profit organization ad-book where the consolidated respective messages define the charitable or not-for-profit organization ad-book where the charitable or not-for-profit organization ad-book is a fundraising vehicle and the recognized not-for-profit organization's members or supporters of the organization solicit for or place the messages to make financial pledges or monetary contributions to the organization and wherein at least some of the messages in the charitable ad-book or related print publication contain laudatory statements about the recognized not-for-profit organization, its activities or its members.

29. A system for preparing computerized/automated preparation, production, publishing and management of charity or not-for-profit organization ad-books and related print or publishing used by or for recognized not-for-profit organizations for charity or fund raising and as a fundraising tool, whereby organizations, members or supporters of the organization place or manage messages in the organization's publication, such system comprising:
- a preparation tool or software program within a charitable or not-for-profit organization server accessible by a plurality of contributors through a communication network;
- means used by the plurality of contributors for preparing a respective message at a respective user terminal connected to the preparations tool or software program through the communications network;
- means for selecting a respective level of sponsorship of a plurality of sponsorship levels by each of the plurality of contributors where a cost associated with each level of the plurality of sponsorship levels is commensurate with various levels of monetary giving from the member, supporter or contributor to the governmentally recognized not-for-profit organizations; and
- means for receiving a respective financial pledge or monetary contribution from each of the contributors on behalf of the recognized not-for-profit organization based upon the selected sponsorship level;
- means for processing the respective messages at a server connected to the communications network; and
- means for consolidating the respective messages into the charitable or not-for-profit organization ad-book where the consolidated messages define the charitable or not-for-profit organization ad-book, where the charitable or not-for-profit organization ad-book or related print publication is primarily a fundraising vehicle and the recognized not-for-profit organizations, members or supporters of the organization solicit for or place the messages to make pledges or monetary contributions to the organization and wherein at least some of the messages in the charitable or not-for-profit organization ad-book or related print publication contain laudatory statements about the recognized not-for-profit organization, its activities or its members or cause or mission.

30. The system of claim 29 wherein the means for preparing further comprises means for selecting choices relating to the message.

31. The system of claim 30 wherein choices comprises size, price, placement, background and layout.

32. The system of claim 30 wherein choices comprises indicating whether the message shall be printed in a physical charitable or not-for-profit organization ad-book or related print or publication or shall be posted on an on-line charitible or not-for-profit organization ad-book posted on an Internet web site as opposed to physically printed publication or wherein the choice comprises whether the message shall be both printed in a physical charitable or not-for-profit organization ad-book or related print or publication and also posted on-line on the Internet web site in an on-line charitable or not-for-profit organization ad-book.

33. The system of claim 29 wherein the means for preparing further comprises means for selecting a message type, price or theme to reduce the number of choices that a member or supporter makes to produce a message.

34. The system of claim 29 wherein the communications network comprises a public switch telephone network and packet data network.

35. The system of claim 29 wherein the user terminal comprises a computer system.

36. The system of claim 35 wherein the computer system comprises one of a personal computer, notebook computer, a personal digital assistant (PDA), a cellular telephone or a mobile/wireless assistant.

37. The system of claim 29 wherein the server comprises a web server computer system for accessing the communications network.

38. The system of claim 37 wherein the web server comprises a firewall for maintaining security.

39. The system of claim 38 wherein the firewall limits access to information on the server wherein information comprises the message and charitable or not-for-profit organization ad-books or related print or publication.

40. The system of claim 29 wherein the means for preparing further comprises means for using computer software to create a message.

41. The system of claim 40 wherein the computer software comprises at least one of Microsoft Office, Corel PageMaker and Adobe PhotoShop.

42. The system of claim 29 wherein the means for processing further comprises receiving payment at the server for processing the message for placement in a charitable or not-for-profit organization ad-book or related print or publication.

43. The system of claim 29 further comprising means for converting the message into an HTML message to be shown on at least one user terminal.

44. The system of claim 43 wherein the HTML message is a part of an electronic presentation of charitable support.

45. The system of claim 43 further comprising means for sending a copy of the HTML message to a member or supporter whom initiated the message solicitation or preparation.

46. The system of claim 29 further comprising means for registering with the server whereby a member or supporter at the user terminal connects to the server and enters information relating to the member or supporter.

47. The system of claim 29 further comprising means for receiving the message from a member or supporter.

48. The system of claim 47 further comprising means for sending an acknowledgement to the member or supporter notifying the member or supporter of the receipt of the message.

49. The system of claim 47 further comprising means for sending an acknowledgement to the member or supporter notifying the member or supporter of payment information.

50. A system for computerized/automated preparation, production, publishing and management of charitable or not-for-profit organization ad-books and related print or publishing used by or for a recognized not-for-profit organization, for charity or fund raising, whereby organizations, members or supporters of the organization place or manage messages for the publication over the Internet for the benefit of the organization, the system comprising:
- a computer system comprising a respective user interface to a communications network used by each of a plurality of contributors and a preparation tool within a charitable or not-for-profit organization server accessed by each of the plurality of contributors through the respective user interface and through the communications network to select a respective level of sponsorship of a plurality of sponsorship levels where a monetary cost associated with each level of the plurality of sponsorship levels is commensurate with various levels of monetary giving from the member, supporter or contributor to the governmentally recognized not-for-profit organizations and to prepare a respective message and to receive a monetary contribution on behalf of the organization; and the charitable or not-for-profit organization server connected to the communications network receives the respective prepared messages and consolidates the respective messages into a charitable or not-for-profit organization ad-book where the consolidated respective messages define the charitable or not-for-profit organization ad-book, where the charitable or not-for-profit organization ad-book or related print publication is a fundraising vehicle and the organizations, members or supporters of the recognized not-for-profit organization solicit for or place the messages to make monetary contributions to the organization and wherein at least some of the messages in the charitable or not-for-profit organization ad-book or related print publication contain laudatory statements about the governmentally recognized not-for-profit organization, for charity or fund raising, its activities or its members.

51. The system of claim 50 wherein the computer system further comprises a graphical user interface for selecting choices relating to the message.

52. The system of claim 51 wherein choices comprises size, placement, color, price, background, and layout.

53. The system of claim 50 wherein the charitable or not-for-profit organization server presents choices relating to a message type or message theme to the computer system.

54. The system of claim 50 wherein the communications network comprises a public switch telephone network and packet data network.

55. The system of claim 50 wherein the computer system further comprises one of a personal computer, a notebook computer, a personal digital assistant (PDA), a cellular telephone or a mobile/wireless assistant.

56. The system of claim 50 wherein the charitable or not-for-profit organization server further comprises a web server computer system capable of interfacing with the Internet.

57. The system of claim 50 wherein the computer system further comprises at least one of Microsoft Office, Corel PageMaker, and Adobe PhotoShop.

58. The system of claim 50 wherein the charitable or not-for-profit organization server further comprises a database of at least one of messages, charitable or not-for-profit organization ad-books or related print or publications, and organizations, members or supporters.

* * * * *